March 6, 1962 R. S. LANCTOT 3,023,763
BALANCED FLAPPER VALVE
Filed Feb. 9, 1960
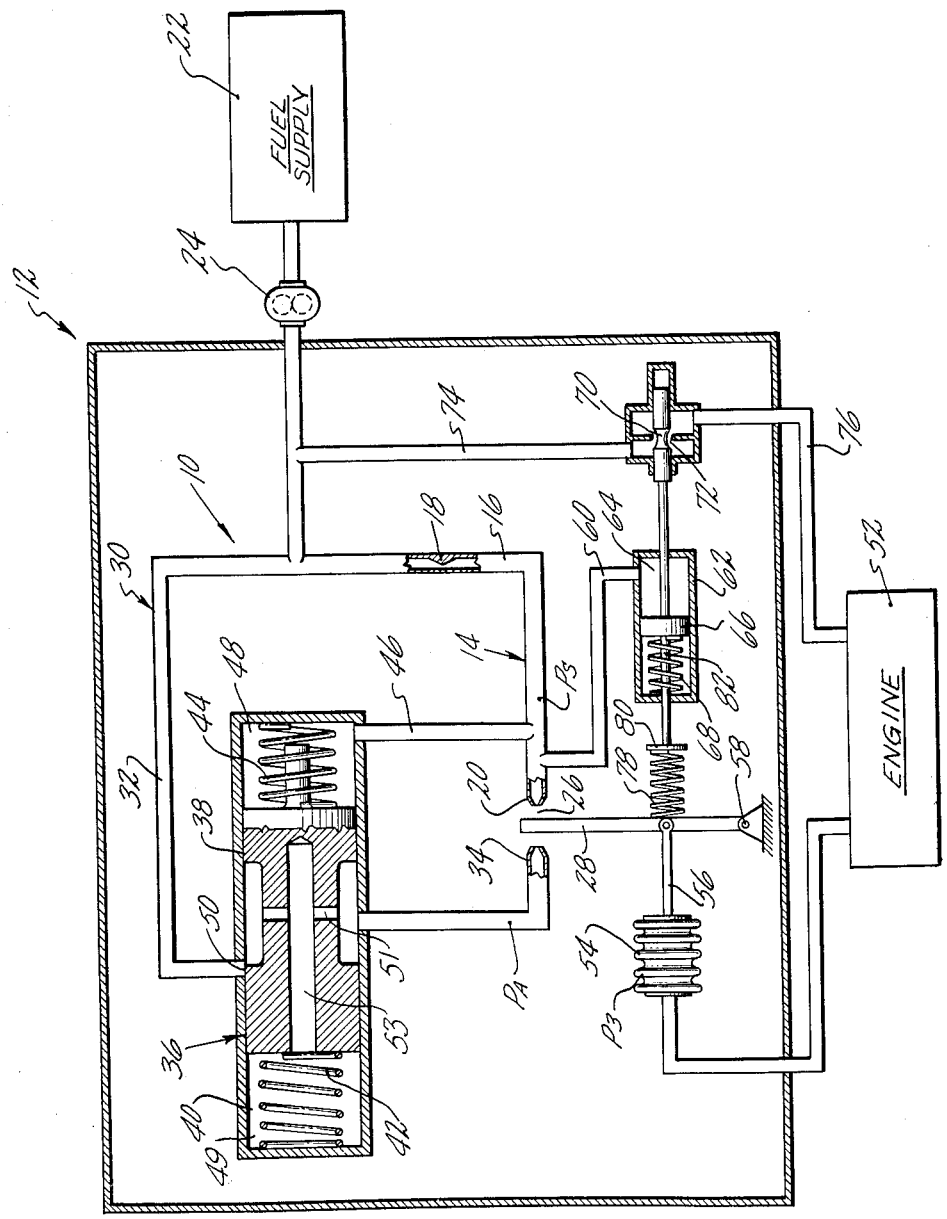
INVENTOR
ROBERT S. LANCTOT
BY Vernon F. Hauschild
ATTORNEY

United States Patent Office 3,023,763
Patented Mar. 6, 1962

3,023,763
BALANCED FLAPPER VALVE
Robert S. Lanctot, Longmeadow, Mass., assignor to United Aircraft Corporation, East Hartford, Conn., a corporation of Delaware
Filed Feb. 9, 1960, Ser. No. 7,634
6 Claims. (Cl. 137—85)

This invention relates to force balance servo systems and more particularly to a balanced flapper valve for use therewith.

It has been found that hydraulic spring rate in a flapper valve is a limiting factor in establishing the sensitivity and accuracy of the servo system in which the flapper valve is used. Accordingly, it is an object of this invention to establish means of controlling the magnitude and orientation of the hydraulic spring rate of a flapper valve in a force balance servo system, so that the hydraulic spring rate may be made positive, negative or may be substantially eliminated as is required to optimize the performance of the servo system in which it is employed.

It is an object of this invention to teach a flapper valve for use in a force balance servo system in which the forces on the flapper valve are balanced at all times.

It is a further object of this invention to teach a flapper valve for a force balance servo system in which a jet of servo fluid is directed against the flapper valve for servo pressure generation purposes and in which an auxiliary jet of fluid is projected against the flapper valve to balance the forces being directed thereagainst by the servo jet at all times and thereby eliminate the hydraulic spring rate in the system.

It is an object of this invention to teach a flapper valve for use in a balance servo system including a first fluid jet impinging against the valve for servo pressure generation purposes and a second fluid jet impinging against the valve at a pressure substantially equal to the pressure of the first jet, but modulated as may be required, to effect flapper valve balancing. In my servo system, both forces which are caused to act against the flapper valve by the jets impinging against opposite sides thereof are compensated for. The first of these forces is the static pressure force and the second is the dynamic or momentum force.

It is still a further object of this invention to provide means for establishing two servo apparatus which project fluid jets in opposition against a flapper beam and which includes means to balance the static pressure forces so imparted to the flapper beam comprising servo pressure regulating means responsive to the pressure differential between the servo pressures in the two servo arrangements, and which also includes means to balance the momentum forces so imparted to said flapper comprising spring means biasing said pressure regulating means in opposition to said servo pressure differential.

Other objects and advantages will be apparent from the specification and claims, and from the accompanying drawings which illustrate an embodiment of the invention.

My drawing is a schematic representation of my balance flapper valve system used in the fuel control for an aircraft engine.

Referring to the drawing we see force balance servo system 10 used in fuel control 12 which may be of the type taught in U.S. Patent No. 2,909,895. Force balance servo system 10 comprises first servo arrangement 14 including servo pressure conduit 16 having fixed area orifice 18 and fixed servo nozzle 20 therein so that as servo fluid is directed through conduit 16 from a fluid source such as 22 through pumps 24, a servo pressure $P_S$ is generated between fixed orifice 18 and variable area orifice 26, defined between fixed nozzle 20 and pivotal flapper beam 28. As flapper beam 28 is caused to move with respect to fixed nozzle 20, it determines the area of variable area orifice 26 and the magnitude of servo pressure $P_S$, which is proportional to the area of variable orifice 26. Force balance servo system 10 also includes second servo arrangement 30 which includes fluid conduit 32 and auxiliary nozzle 34, with pressure regulating valve 36 therebetween comprising a moveable piston member 38 snugly received within cylinder 40, with piston 38 resiliently supported between springs 42 and 44. Servo pressure $P_S$ from the first servo arrangement 14 is ported through conduit 46 into chamber 48 at the right side of piston 38 to assist spring 44 in overcoming spring 42 and thereby forcing piston 38 leftwardly to regulate the area of regulating port 50, defined between cylinder 40 and piston 38. The area of port 50 regulates the flow and hence the pressure of fluid which will flow through second servo arrangement 30 and auxiliary nozzle 34 to establish auxiliary pressure $P_A$ therebetween and to project an auxiliary fluid jet against flapper valve 28. Auxiliary pressure $P_A$ passes into chamber 49 through conduits 51 and 53 to act upon the left side of piston 38 to force it rightwardly. The fluid which is passed through second servo arrangement 30 may come from source 22 or a source independent thereof (not shown). Piston 38 of pressure regulating valve 36 is positioned as a function of servo pressure $P_S$ generated in the first servo arrangement 14, auxiliary pressure $P_A$ generated in the second servo arrangement 30, and springs 42 and 44.

The auxiliary pressure $P_A$ generated between regulating valve 36 and auxiliary nozzle 34 is, in part, a function of the springs 42 and 44 and the valve port 50. If auxiliary pressure $P_A$ were made equal to servo pressure $P_S$ the static pressure drops across the flapper would cancel but, because the flapper is shutting one nozzle while it opens the other, and therefore will sometimes be closer to one nozzle than the other the dynamic forces would differ. Therefore auxiliary pressure $P_A$ is made sufficiently different from $P_S$ so that the sum of the static pressure force and dynamic or momentum force of the auxiliary nozzle equals the sum of the static pressure force and dynamic or momentum force of the first servo nozzle at all times.

To fully understand the aforementioned balance of the combined static pressure force and dynamic or momentum force on opposite sides of servo flapper 28, let us consider separately how my invention affects each of the two forces, that is, (1) the static pressure force and (2) the dynamic force, acting on opposite sides of flapper valve 28. The static force imparted to flapper 28 by the fluid jets impinging against the opposite sides thereof by nozzles 20 and 34 is equal to the static pressure, $P_S$ or $P_A$ multiplied by the area of the nozzle 20 or 34. Flapper valve 28 is in equilibrium from a static force standpoint when the opposite sides of the following equation are equal.

$$(P_S)(A_{20}) = (P_A)(A_{34}) \quad \text{(Equation 1)}$$

where $A_{20}$ = area of nozzle 20
$A_{34}$ = area of nozzle 34

Piston 38 of my regulator valve 36 serves to maintain the static pressure equilibrium by varying either pressure $P_S$ or $P_A$ in response to changes in the other of the pressures to bring about equalization of the opposite sides of Equation 1. For example, if flapper valve 28 moves leftwardly toward nozzle 34, such flapper valve action will decrease pressure $P_S$. The reduction of pressure $P_S$, which is present in chamber 48, causes piston 38 to move rightwardly due to the fact that pressure $P_A$ which is present in chamber 49 through conduits 51 and 53, is now greater than pressure $P_S$. This rightward movement of piston 38 reduces the area of port 50 and thereby reduces pressure $P_A$ to a point where Equation 1 is equalized and therefore flapper 28 has cancelling static pressure forces acting thereagainst. If the static pressure force were the only jet inflicted pressure force acting on flapper 28, piston 38 of regulator valve 36 would be able to maintain our flapper valve in force balance. However, there is a second force, called either a dynamic or momentum force being imparted to flapper 28 by the impingement of fluid jets from nozzles 20 or 34 thereagainst. This momentum force varies as the velocity of the fluid jet varies since it follows the general formula:

$$F = ma \qquad \text{(Equation 2)}$$

which may also be expressed as $$F = W(V_1 - V_2) \qquad \text{(Equation 3)}$$

where $W$ = the flow rate of the fluid
$V_1$ = velocity of fluid in direction of flapper before direction change brought about by flapper impact
$V_2$ = velocity of fluid in direction of flapper after direction change Since the fluid is flowing parallel to the flapper 28 after impingement, $V_2$ is zero so Equation 2 may be rewritten:

$$F = W(V_1) \qquad \text{(Equation 4)}$$

It is characteristic of servo jet flow that the servo fluid velocity increases as flapper 28 moves away from the jet creating nozzle and its velocity decreases as flapper 28 moves toward the jet created nozzle. Accordingly, in the aforementioned example regarding static force cancellation, when flapper 28 was moving toward nozzle 34 and away from nozzle 20, the dynamic or momentum force imparted to the right side of flapper 28 was increasing while that to the left side was decreasing. Due to this momentum force difference, our flapper 28 will not be brought into force balance equilibrium by merely correcting the static pressures $P_S$ and $P_A$ to bring about equalization of opposite sides of Equation 1; therefore, these static forces $P_S$ and $P_A$ must be made unequal so as to compensate for this momentum force difference. This momentum force difference is compensated for in my system by the presence of springs 42 and 44 which are located on opposite sides of piston 38 and serve to bias the piston 38 and hence alter regulating port and $P_A$ in response to momentum force changes in the manner now to be described.

Since the leftward movement of flapper 28 caused an increase in the momentum force imparted to flapper 28 by the servo jet from nozzle 20 and a decrease in momentum force imparted to flapper 28 by the jet from nozzle 34, my control must cause force $P_A$ to become sufficiently greater than force $P_S$ that the static force Equation 1 will be unbalanced an amount which will tend to cancel the momentum force unbalance. As piston 38 moved rightwardly to compensate for the reduction in pressure $P_S$ brought about by the aforementioned leftward movement of flapper 28, this rightward movement of piston 38 compressed spring 44 and relaxed spring 42. This spring action brings about an increase in pressure $P_A$ because piston 38, with springs 42 and 44 on opposite sides thereof, comes into an equilibrium position when the following equation is satisfied:

$$(P_A)(A_{38}) = (P_S)(A_{38}) + D_{38}(R_{44} + R_{42})$$

where $A_{38}$ = area of piston 38
$D_{38}$ = distance piston 38 moves
$R_{44}$ = rate of spring 44
$R_{42}$ = rate of spring 42

It will accordingly be seen that when the foregoing equation is satisfied and hence piston 38 is in equilibrium, $P_A$ is greater than $P_S$ and therefore springs 44 and 42 have imparted a momentum force bias to piston 38 in a direction to alter $P_A$ to compensate for momentum force unbalance on flapper valve 28 at the same time that piston 38 compensates for static force unbalance on flapper 28. The rates of springs 42 and 44 will preferably be selected to fully or substantially fully compensate for momentum force variations.

It will be obvious to those skilled in the art that auxiliary nozzle 34 need not necessarily be placed in alignment with servo nozzle 20 but could selectively be positioned on beam 28 so that the torque generated thereagainst by the fluid passing through nozzle 34 or 20 will be canceling. For example, fixed nozzles 20 and 34 could as well be placed on the same side of flapper beam 28 provided that they were on opposite sides of the beam pivot point 58. Further, the diameter of the second servo nozzle and its distance from the flapper may be chosen at will to achieve the force characteristics desired. For example over compensation would make the hydraulic spring rate of the flapper negative which might be used to reduce the high positive spring rate of a servo system.

As a preferred embodiment, I illustrate my force balanced servo system 10 in conjunction with a fuel control 12 regulating the flow of fuel to aircraft engine 52. Engine 52 may be of the type taught in U.S. Patent Nos. 2,711,631, 2,426,879 or 2,747,367. Flapper beam 28 is positioned by input means 54 which is preferably an expandable bellows which is subjected to a parameter such as engine compressor discharge pressure, $P_3$ which is, indicative of the speed or output of engine 52. Input means 54 is pivotally connected to flapper beam 28 by connecting rod 56 and causes flapper beam 28 to pivot about pivot point 58 and thereby regulate the area of variable area orifice 26 as a function of compressor discharge pressure $P_3$ and hence engine speed or output so that servo pressure $P_S$ is a function of either engine speed or engine speed error. Servo pressure $P_S$ communicates through conduit 60 with output means 62. Servo pressure enters chamber 64 to vary the position of piston 66 in opposition to the urging of spring 68 to position contoured plunger 70 in orifice 72 so as to regulate the flow of fuel from line 74 and through orifice 72 and thence through line 76 to engine 52.

In the fashion just described, it will be seen that force balance servo system 10 is used to cause the flow of fuel to engine 52 through line 76 to vary as a function of engine speed or engine speed error as imparted to system 10 in the form of a parameter such as compressor discharge pressure $P_3$.

Spring 78, plate 80 and rod 82 coact to perform a feedback function between output piston 66 and flapper valve 28.

It will be noted that the balanced flapper valve arrangement taught herein is fail-safe since force balance servo system 10 will continue to operate with a conventional flapper valve should the second servo arrangement 30 malfunction.

It is to be understood that the invention is not limited to the specific embodiment herein illustrated and described but may be used in other ways without departure from its spirit as defined by the following claims.

I claim:

1. In a force balance servo system, a first servo arrangement comprising a servo pressure conduit including a fixed area orifice and a fluid jet, a pivotal flapper beam positionable with respect to said fluid jet to define a variable area orifice therewith so that a servo pressure is formed between said fixed and variable area orifices proportional to the area of said variable area orifice when servo fluid is passed through said first arrangement, and a second servo arrangement positioned to direct an auxiliary jet of fluid against said flapper beam and including pressure regulating means responsive to said servo pressure and operatively connected to regulate said auxiliary jet of fluid so that the motive forces imparted to said pivotal flapper beam by said first and second arrangements are substantially in balance at all times.

2. In a force balance servo system, a first servo arrangement comprising a servo pressure conduit including a fixed area orifice and a fluid nozzle through which a fluid jet will project when servo fluid is passed through said first arrangement, a pivotal flapper beam positionable with respect to said fluid jet to define a variable area orifice therewith so that a servo pressure is formed between said fixed and variable area orifices proportional to the area of said variable area orifice when servo fluid is passed through said first arrangement, input means positioning said pivotal flapper beam, output means responsive to said servo pressure, and a second servo arrangement including a fluid conduit terminating in an auxiliary nozzle positioned to direct an auxiliary jet of fluid against said flapper beam in alignment with and in opposition to said fluid jet, a pressure regulator responsive to said servo pressure and located in said fluid conduit to establish the pressure between said auxiliary nozzle and said pressure to be substantially equal to said servo pressure at all times so that the motive forces imparted to said pivotal flapper beam by said first and second arrangements are substantially in balance at all times thereby eliminating hydraulic spring rate from said system, and means to provide a pressurized fluid to said first and second arrangements.

3. In a force balance servo system, a first servo arrangement comprising a first conduit including a fixed area orifice and a first fixed area nozzle through which a first fluid jet will be discharged when servo fluid is passed through said first conduit, a pivotal flapper beam positionable with respect to said first fixed area nozzle to define a first variable area orifice therewith so that a first servo pressure is formed between said fixed and said first variable area orifices proportional to the area of said first variable area orifice when servo fluid is passed through said first arrangement, and so that a first static pressure force equal to the product of said first fixed area nozzle and said first servo pressure is imparted to said flapper beams by said first fluid jet, and a second servo arrangement including a second conduit having a third variable area orifice and a second fixed area nozzle through which a second fluid jet will be discharged when servo fluid is passed through said second conduit, said second fixed area orifice being positioned adjacent said flapper beam to define a second variable area orifice therewith to thereby establish a second servo pressure between said third variable area orifice and said second variable area orifice, said second fixed area nozzle further being positioned to direct said second fluid jet against said flapper beam in opposition to said first fluid jet so that a second static pressure force equal to the product of said second fixed area nozzle and said second servo pressure is imparted to said flapper beam by said second fluid jet in opposition to said first fluid jet, said second servo arrangement further including a pressure regulating valve in said second conduit comprising a movable member within a cylinder and subjected to both said first and second servo pressures so that said movable member moves within said cylinder in response to the difference between said servo pressures to define said third variable area orifice and thereby cause the product of said first servo pressure and the area of said first fixed area nozzle to be equal to the product of said second servo pressure and said second fixed area nozzle so that the static pressure forces imparated to said pivotal flapper beam by said first and second arrangements are substantially in balance at all times.

4. In a force balance servo system, a first servo arrangement comprising a first conduit including a fixed area orifice and a first fixed area nozzle through which a first fluid jet will be discharged when servo fluid is passed through said first conduit, a pivotal flapper beam positionable with respect to said first fixed area nozzle to define a first variable area orifice therewith so that a first servo pressure is formed between said fixed and said first variable area orifices proportional to the area of said first variable area orifice when servo fluid is passed through said first arrangement and so that a first static pressure force equal to the product of said first fixed area nozzle and said first servo pressure is imparted to said flapper beam by said first fluid jet and further so that a first momentum force responsive to relative movement between said flapper beam and said first fixed area nozzle is also imparted to said flapper beam by said first fluid jet, and a second servo arrangement including a second conduit having a third variable area orifice and a second fixed area nozzle through which a second fluid jet will be discharged when servo fluid is passed through said second conduit, said second fixed area orifice being positioned adjacent said flapper beam to define a second variable area orifice therewith to thereby establish a second servo pressure between said third variable area orifice and said second variable area orifice, and said second fixed area nozzle further being positioned to direct said second fluid jet against said flapper beam in opposition to said first fluid jet so that a second static pressure force equal to the product of said second fixed area nozzle and said second servo pressure is imparted to said flapper beam by said second fluid jet in opposition to said first static pressure force and further so that a second momentum force responsive to relative movement between said flapper beam and said second fixed area nozzle is also imparted to said flapper beam by said second fluid jet in opposition to said first momentum force, said second servo arrangement further including a pressure regulating valve in said second conduit comprising a piston movable within a cylinder to establish end chambers therewith and subjected to both said first and second servo pressures so that said piston moves within said cylinder in response to the difference between said servo pressures to define said third variable area orifice and thereby cause the product of said first servo pressure and the area of said first fixed area nozzle to be equal to the product of said second servo pressure and said second fixed area nozzle so that the static pressure forces imparted to said pivotal flapper beam by said first and second arrangements are substantially in balance at all times, said second servo arrangement further including spring means in said end chambers serving to position said piston within said cylinder in opposition to piston movement created by the pressure differential thereacross established by said first and second servo pressures to thereby increase the effect on said piston of the lesser of said servo pressures and bias said piston to correct unbalance between said first and second momentum forces.

5. In a force balance servo system, a movable flapper beam, a first servo system including a first fixed nozzle positioned adjacent said flapper and defining a first variable area orifice therewith, means to establish a first servo pressure upstream of said nozzle and to create a first fluid jet passing through said first nozzle and impinging against said flapper beam imparting a first static pressure force and a first momentum force thereagainst, a second servo system including a second fixed nozzle, positioned adjacent said flapper beam in opposition to said first nozzle and including means to establish a second servo pressure upstream of said second nozzle and to create a second fluid jet passing through said second nozzle and impinging against said flapper beam in opposition to said first fluid jet to establish both a second static pressure force and a second momentum force against said flapper in opposition to said first static pressure and momentum forces, said static pressure forces having the characteristic of increasing as said flapper approaches their establishing fixed nozzle and decreasing as said flapper departs from their establishing fixed nozzle and said momentum forces having the characteristic of decreasing in response to such flapper approach action and increasing in response to such flapper departure action, pressure regulating means operatively connected to said second servo system and responsive to the pressure differential between said servo pressures to vary said second servo pressure in response to unbalance of said static pressure forces, and momentum force balance means including spring means biasing said regulating means in opposition to said servo pressure differential to alter said second servo pressure so as to balance said momentum forces.

6. In a servo system, a flapper movable between two fixed nozzles to define variable area orifices therewith, means establishing a first servo pressure upstream of a first of said fixed nozzles, means establishing a second servo pressure upstream of the second of said fixed nozzles, pressure regulating means responsive to servo pressure differential maintaining said second servo pressure to equal said first servo pressure, and means biasing said pressure regulating means in opposition to said servo pressure differential.

References Cited in the file of this patent

UNITED STATES PATENTS

| | | |
|---|---|---|
| 2,053,797 | King | Sept. 8, 1936 |
| 2,911,991 | Pearl | Nov. 10, 1959 |